United States Patent
Hrebek et al.

(10) Patent No.: US 7,484,169 B2
(45) Date of Patent: Jan. 27, 2009

(54) IMPLICIT MESSAGE SEQUENCE NUMBERING FOR LOCOMOTIVE REMOTE CONTROL SYSTEM WIRELESS COMMUNICATIONS

(75) Inventors: Gregory Paul Hrebek, Melbourne, FL (US); Mark Wayne Wheeler, Palm Bay, FL (US)

(73) Assignee: General Electric Company, Schenectady, NY (US)

( * ) Notice: Subject to any disclaimer, the term of this patent is extended or adjusted under 35 U.S.C. 154(b) by 536 days.

(21) Appl. No.: 11/354,828

(22) Filed: Feb. 15, 2006

(65) Prior Publication Data

US 2007/0192668 A1 Aug. 16, 2007

(51) Int. Cl.
*H03M 13/09* (2006.01)
(52) U.S. Cl. .................................. 714/807; 714/811
(58) Field of Classification Search ................. 714/807, 714/811
See application file for complete search history.

(56) References Cited

U.S. PATENT DOCUMENTS

| | | | | |
|---|---|---|---|---|
| 4,498,650 | A * | 2/1985 | Smith et al. ............. | 246/122 R |
| 5,420,883 | A * | 5/1995 | Swensen et al. ............. | 375/138 |
| 5,570,284 | A * | 10/1996 | Roselli et al. ................... | 701/2 |
| 5,685,507 | A | 11/1997 | Horst et al. | |
| 5,974,081 | A * | 10/1999 | Rosas et al. ................... | 375/133 |
| 6,400,281 | B1 * | 6/2002 | Darby et al. ................. | 340/933 |
| 6,401,015 | B1 | 6/2002 | Stewart et al. | |
| 6,631,873 | B2 | 10/2003 | Fisher | |
| 6,684,363 | B1 * | 1/2004 | Cassiday et al. ............. | 714/776 |
| 6,687,231 | B1 | 2/2004 | Czerwiec et al. | |
| 6,751,209 | B1 | 6/2004 | Hamiti et al. | |
| 6,867,708 | B2 * | 3/2005 | Darby et al. ................. | 340/933 |
| 6,965,816 | B2 * | 11/2005 | Walker ......................... | 701/16 |
| 7,027,773 | B1 * | 4/2006 | McMillin ................... | 455/41.2 |
| 7,131,614 | B2 * | 11/2006 | Kisak et al. ............. | 246/167 R |
| 7,162,337 | B2 * | 1/2007 | Peltz et al. .................... | 701/19 |
| 7,188,341 | B1 * | 3/2007 | Hawthorne et al. ......... | 717/171 |
| 7,203,228 | B2 * | 4/2007 | Horst et al. .................. | 375/222 |
| 7,233,844 | B2 * | 6/2007 | Peltz et al. .................... | 701/19 |
| 7,236,859 | B2 * | 6/2007 | Horst et al. .................... | 701/19 |
| 7,248,150 | B2 * | 7/2007 | Mackjust et al. ....... | 340/426.13 |
| 7,263,647 | B2 * | 8/2007 | Bryant et al. ............... | 714/758 |
| 7,395,141 | B1 * | 7/2008 | Seck et al. .................... | 701/19 |
| 2003/0084395 | A1 | 5/2003 | Bryant et al. | |
| 2003/0226091 | A1 | 12/2003 | Platenberg et al. | |
| 2004/0088086 | A1 | 5/2004 | Horst | |

FOREIGN PATENT DOCUMENTS

| | | | |
|---|---|---|---|
| EP | 0326630 A1 | 8/1989 | |
| EP | 1261184 A1 | 11/2002 | |

* cited by examiner

*Primary Examiner*—Stephen M Baker
(74) *Attorney, Agent, or Firm*—John Kramer, Esq.; Enrique J. Mora, Esq.; Beusse Wolter Sanks Mora & Maire, P.A.

(57) ABSTRACT

A method for providing wireless communications between a locomotive control unit (LCU) (14) on board a locomotive (16) and a portable operator control unit (OCU) (12) for use in controlling operation of the locomotive from an off-board location includes calculating a transmit bit error check value for a wireless message. The wireless message includes an explicit sequence number assigned to the message so that the explicit sequence number is implicitly encoded in the transmit bit error check value. The method also includes transmitting an encoded message between the OCU and the LCU with the transmit bit error check value and without the explicit sequence number effective to reduce a total amount information needed to be transmitted compared to a message including the explicit sequence number.

22 Claims, 1 Drawing Sheet

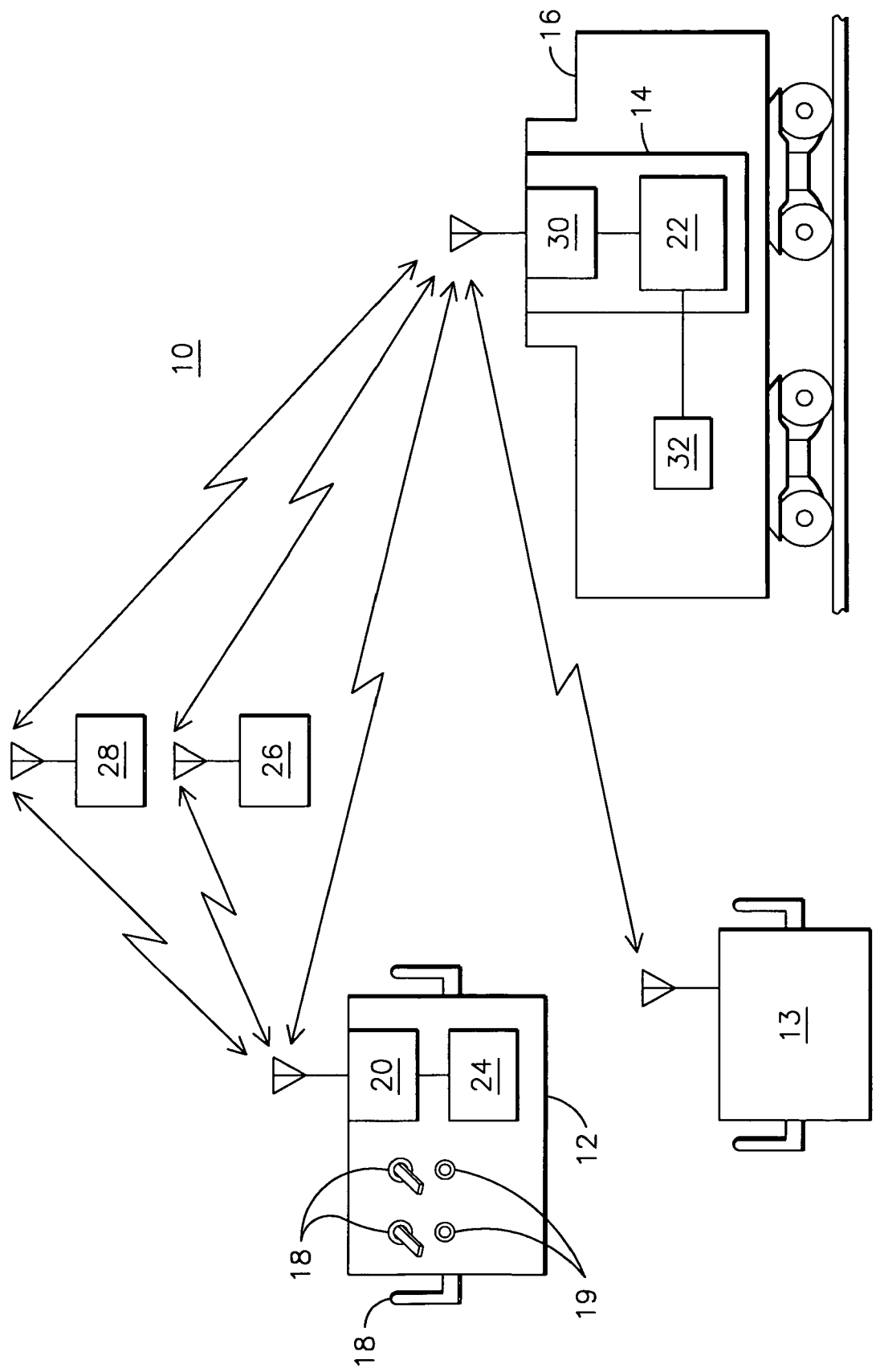

IMPLICIT MESSAGE SEQUENCE NUMBERING FOR LOCOMOTIVE REMOTE CONTROL SYSTEM WIRELESS COMMUNICATIONS

FIELD OF THE INVENTION

This invention relates to the field of remote control of locomotives, and, more particularly, to providing implicit message sequence numbering for locomotive remote control wireless communications.

BACKGROUND OF THE INVENTION

It is known to remotely control locomotives in a switchyard using remote radio transmitting devices controlled by rail yard personnel. Modern remote control systems allow yard operators to control driverless, microprocessor-equipped switching locomotives controlled by an on-board Locomotive Control Unit (LCU) using a battery-powered portable Operator Control Unit (OCU) to be carried by an operator located adjacent to, but off-board of the locomotive to be controlled. Repeaters may be provided in a locomotive remote control system network infrastructure to enhance radio communications between widely separated OCUs and LCUs.

The operator, via commands input at the OCU, controls the movement of the locomotive, while locomotive operating data and warnings are returned from the locomotive to the OCU. To provide remote control of the locomotive, two-way wireless communication is established between the OCU and the LCU. Typically, communications between the OCU and the LCU are accomplished using a packet transmission scheme comprising individual radio messages. For example, commands issued by the OCU to the LCU may be encoded and sent over the communications link in respective radio messages.

In locomotive remote control applications, it is important to provide safety information with each message issued over the wireless communication link to ensure commands are properly received and executed. Accordingly, each radio message may include a portion of the message reserved for a command, a portion reserved for a bit error checking scheme value, such as a cyclic redundancy check (CRC) value, for the message, and a portion reserved for a sequence number indicative of the message's sequence position in relation to a sequence of messages being transmitted. Such sequence numbering of transmitted messages allows for identification of stale messages, for example, provided via by a repeater that may already have been received and acted upon. An ability to identify stale messages is important for the safe operation of a remotely controlled locomotive. An amount of information that can be transmitted over as wireless link may be limited by factors such as the transmission frequency, the transmission frequency bandwidth and the baud rate available at the transmission frequency.

BRIEF DESCRIPTION OF THE DRAWINGS

The sole FIGURE is a schematic representation of an improved locomotive remote control system for providing implicit message sequence numbering for locomotive remote control wireless communications.

DETAILED DESCRIPTION OF THE INVENTION

Locomotive remote control communication systems may be limited by frequency, bandwidth, and/or baud rate constraints. Accordingly, it is desired to efficiently encode as much information as possible into each message transmitted by the system. Safety concerns dictate that message integrity information, such as CRC information, and message identification information, such as a message sequence numbering, be encoded in each transmitted message. The inventors of the present invention have developed an innovative communication scheme that reduces the amount of explicit message sequence information needed to be transmitted in each message, while still providing safe locomotive remote control operations. In an embodiment of the invention, the scheme includes calculating a CRC of a message that includes a sequence number, and then transmitting the message that includes a CRC value implicitly encoding the sequence number, but does not include an explicit sequence number. Message sequence information is then decoded based on an expected message sequence number.

An improved locomotive remote control system 10 is illustrated in the FIGURE as including one or more Operator Control Units (OCUs) 12, 13 in wireless communication with a Locomotive Control Unit (LCU) 14 on-board a remotely controlled locomotive 16. The LCU 14 may include an LCU processor 22 and a transceiver 30 for transmitting locomotive information, such as a condition sensed by one or more sensors 32, to OCUs 12, 13 and receiving locomotive commands from OCUs 12, 13. The wireless communications between the LCU 14 and OCUs 12, 13 may be accomplished via remote control communication network elements such as a centralized control center 28 and/or one or more repeaters 26. OCU 12 may include a transceiver 20 in communication with an OCU processor 24. Locomotive control information, such as remote control commands, may be directly communicated between the OCU 12 and LCU 14, or may be indirectly communicated via the control center 28 and/or repeater 29. The OCU 12 may include various actuators 18, such as control levers, buttons, and switches, and indicators 19, such as lamps and LEDs, to allow an operator of the OCU 12 to implement locomotive remote control commands.

When initially establishing communications between the LCU 14 and the OCU 12, such as via an infrared (IR) linking procedure, the LCU 14 may send the OCU 12 a present time and date in the form of a number of seconds since a certain time and date, such as Jan. 1, 2000. Each time the OCU 12 transmits a message, the OCU 12 may increment the number of seconds since Jan. 1, 2000 initially received from the LCU 14 by one. For safety critical messages, such as operational commands for the locomotive, the message may include a sequence number. Accordingly, the sequence number provides a unique message identifier that allows identification of stale messages received at the LCU 14. The sequence number may include an incremented version of the current time and date originally provide by the LCU 14, such as during the linking procedure. For example, each time the OCU 12 sends a message, the sequence number may be incremented by one from the sequence number used in a prior message. In addition, each message transmitted by the OCU 12 may include a bit error checking code, such as a CRC value calculated for the message.

Typically, when a message is constructed by the OCU 12, the OCU 12 appends an explicit message sequence number to the message and calculates the CRC value for the message, including the explicit message sequence number. As used herein, explicit means that values representing the message sequence number, such as individual bits representing of the message sequence number, are directly included in the message. The message, including the explicit sequence number and the CRC value, is then transmitted to the LCU 14. Because a sequence number being based on the number of seconds elapsed since Jan. 1, 2000 may be relatively large, the explicit sequence number may require a disproportionate amount of space, or payload, in the transmitted message.

In an innovative aspect of the invention, the sequence number may be implicitly encoded in the CRC, advantageously eliminating the need to explicitly include the sequence number in the message being sent to the LCU 14. As used herein, implicitly means that the sequence number is indirectly encoded in the message as opposed to being explicitly, or directly, included in the message. By eliminating the need to include an explicit sequence number, the payload requirement of the message may be reduced compared to a message including an explicit sequence number.

A method for providing such reduced payload messaging between the OCU 12 and LCU 14 may include calculating a transmit CRC value for a wireless message that includes an explicit sequence number assigned to the message so that the explicit sequence number is implicitly encoded in the transmit CRC value. For example, the transmit CRC value may be calculated for a message that include bits representative of the explicit sequence number. The method may also include transmitting an encoded message that includes the transmit CRC value encoded with the implicit sequence number, but does not include the explicit sequence number, to the LCU 14. By eliminating the need to include the explicit sequence number, a total amount of information needed to be transmitted compared to a message including the explicit sequence number may be reduced.

The method may also include receiving the encoded message at the LCU 14 and determining if the encoded message is valid (i.e., validating the encoded message) according to the transmit CRC value and an expected sequence number for the encoded message. In an aspect of the invention, the expected sequence number may be generated by the LCU 14 based on an initial number and/or an increment of an initial number provided to the OCU 12 by the LCU 14 during a linking procedure. For example, the LCU 14 may expect a sequence number greater than the last message sequence number received from the OCU 12 because the OCU 12 may be configured to increment the sequence number each time it sends a message. The LCU 14 may maintain different expected sequence numbers for different OCUs 12, 13 that the LCU 14 has been linked with.

Validating the transmitted message may include calculating a receipt CRC for the transmitted message that includes an expected sequence number, but does not include the transmit CRC, and then comparing the receipt CRC to the transmit CRC to see if the CRC values match, indicating a valid message. In an embodiment, validation may include truncating the transmit CRC value from the encoded message and appending the expected sequence number to a truncated encoded message. A receipt CRC for the truncated encoded message and the appended expected sequence number may then be calculated. The method may then include comparing the transmit CRC to the receipt CRC to validate the transmitted message. When the encoded message cannot be validated according to the expected sequence number, the present expected sequence number may be incremented and the steps of truncating, appending, calculating a receipt CRC, and comparing transmit and receipt CRCs may be repeated based on the incremented sequence number. This cycle of validation may be repeated until the message is validated, or may be limited to certain number of expected sequence number incrementing cycles, after which the message is declared invalid and the LCU 14 may ignore the message. For example, the LCU 14 may establishing a plurality of expected sequence numbers incrementally extending from an initial expected sequence number to be used as a window for identifying valid messages. In an embodiment of the invention, the window may be set to five expected sequence numbers that may be used to attempt to validate data a message before declaring the message invalid. In yet another aspect, when the explicit sequence number of the encoded message received by the LCU 14 is less than an expected sequence number, the LCU 14 may ignore the message as being stale.

An example sequence of message validation may be as follows: LCU 14 provides an initial sequence number, n, to OCU 12 during an initial linking procedure. OCU 12 then provides a message including n as sequence number encoded in the transmit CRC. LCU 14, expecting the message to have a CRC implicitly encoded with n, validates the received message based on implicitly encoded n and expected sequence number of n. LCU 14 increments next expected sequence number to n+1. OCU 12 increments its sequence number and sends next message having n+1, and LCU 14, expecting to receive next message with n+1, validates message. LCU 14 increments next expected sequence number to n+2. LCU 14 may then receive a message with sequence number n+3. LCU 14, expecting to receive message with sequence number n+2 cannot validate message with n+2, so LCU increments to n+3 and can then validate the message. LCU 14 may then receive a message having sequence number of n+1 (perhaps delayed through network). LCU 14 ignores message as being stale.

In another embodiment, the LCU 14 may be configured to recognize messages not being encoded with a sequence number, such as a non-critical message, before attempting to append an expected sequence number to the message for decoding a sequence number. For example, an initial message validation may include truncating the transmit CRC value from the message and then calculating the receipt CRC for a truncated message and verifying if the CRC values match. If no CRC match is found, expected sequence numbers may then be appended as described previously attempt to validate the message.

In yet another aspect of the invention, the OCU 12 may update sequence numbering according to instructions received for the LCU. For example, the LCU 14 may periodically provide a relink message to the OCU 12 that includes a relink sequence number. Upon receipt of the relink command the OCU 12 may update the explicit sequence number presently maintained by the OCU 12 with the relink sequence number if the explicit sequence number presently maintained is less than the relink sequence number.

Based on the foregoing specification, the methods described may be implemented using computer programming or engineering techniques including computer software, firmware, hardware or any combination or subset thereof, wherein the technical effect is to provide implicit message sequence numbering for locomotive remote control wireless messages. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a processors 22, 24, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions will occur to those of skill in the art without departing from the invention herein.

We claim:

1. A method for providing wireless communications between a locomotive control unit (LCU) on board a locomotive and a portable operator control unit (OCU) for use in controlling operation of the locomotive from an off-board location comprising:
    calculating a transmit bit error check value for a wireless message that includes an explicit sequence number assigned to the message so that the explicit sequence number is implicitly encoded in the transmit bit error check value; and
    transmitting an encoded message between the OCU and the LCU with the transmit bit error check value and without the explicit sequence number effective to reduce a total amount information needed to be transmitted compared to a message including the explicit sequence number.

2. The method of claim 1, wherein the bit error check value comprises a cyclical redundancy check (CRC) value.

3. The method of claim 1, further comprising receiving, at the OCU, a relink message from the LCU comprising a relink sequence number.

4. The method of claim 3, further comprising updating a current explicit sequence number maintained by the OCU with the relink sequence number when the relink sequence number is greater than the current explicit sequence number.

5. The method of claim 1, further comprising receiving the encoded message at the LCU and validating the encoded message according to the transmit bit error check value and an expected sequence number for the encoded message.

6. The method of claim 5, wherein the expected sequence number comprises a number based on an initial number provided to the OCU by the LCU during a linking procedure.

7. The method of claim 5, further comprising, when the encoded message has been validated, incrementing the expected sequence number.

8. The method of claim 5, further comprising, when the explicit sequence number of the encoded message is less than the expected sequence number, ignoring the message.

9. The method of claim 5, wherein the expected sequence number is greater than a sequence number of a previously received message.

10. The method of claim 5, further comprising establishing a plurality of expected sequence numbers incrementally extending from the expected sequence number.

11. The method of claim 5, further comprising, when the encoded message cannot be validated according to the expected sequence number, incrementing the expected sequence number.

12. The method of claim 11, further comprising validating the encoded message according to the transmit bit error check value and an incremented expected sequence number for the encoded message.

13. The method of claim 12, further comprising, when a message cannot be validated after a desired number of cycles of incrementing the expected sequence number and attempting to validate the encoded message, ignoring the message.

14. The method of claim 5, wherein validating comprises truncating the transmit bit error check value from the encoded message.

15. The method of claim 14, further comprising appending the expected sequence number to a truncated encoded message.

16. The method of claim 15, further comprising calculating a receipt bit error check value for the truncated encoded message and an appended expected sequence number.

17. The method of claim 16, further comprising comparing the transmit bit error check value to the receipt bit error check value to validate the transmitted message.

18. A method for providing wireless digital communications between a locomotive control unit (LCU) on board a locomotive and a portable operator control unit (OCU) for use in controlling operation of the locomotive from an off-board location comprising:
    calculating a transmit bit error check value for a wireless digital message that includes bits for an explicit sequence number assigned to the message so that the sequence number is implicitly encoded in the bit error check value;
    transmitting the message from the OCU to the LCU with calculated bit error check value and without the explicit sequence number bits effective to reduce a total amount bits needed to be transmitted compared to a number of bits of a message explicitly including the sequence number;
    receiving the encoded message at the OCU and validating the encoded message according to the transmit bit error check value and an expected sequence number for the encoded message.

19. The method of claim 18, wherein validating comprises:
    calculating a receipt bit error check value for the encoded message that includes the expected sequence number but does not include the transmit bit error check value; and
    comparing the receipt bit error check value to the transmit bit error check value to validate the transmitted message.

20. The method of claim 18, wherein the bit error check value comprises a cyclical redundancy check (CRC) value.

21. A system for providing wireless communications between a locomotive control unit (LCU) on board a locomotive and a portable operator control unit (OCU) for use in controlling operation of the locomotive from an off-board location comprising:
    an OCU comprising:
    an OCU processor;
    OCU programmed logic operable with the OCU processor for calculating a bit error check value for a wireless message that includes an explicit sequence number assigned to the message and for generating an encoded message with the transmit bit error check value and without the explicit sequence number;
    an OCU transceiver in communication with the OCU processor for transmission of the encoded message;
    an LCU comprising:
    an LCU transceiver for receiving the encoded message;
    an LCU processor in communication with the transceiver; and
    LCU programmed logic operable with the LCU processor for validating the encoded message according to the transmit bit error check value and an expected sequence number for the encoded message.

22. The system of claim 21, wherein the bit error check value comprises a cyclical redundancy check (CRC) value.

* * * * *